United States Patent

[11] 3,596,786

| [72] | Inventors | Arthur A. Bernard<br>Beecher;<br>Richard A. Bernard, Flossmoor, both of, Ill. |
|---|---|---|
| [21] | Appl. No. | 780,976 |
| [22] | Filed | Dec. 4, 1968 |
| [45] | Patented | Aug. 3, 1971 |
| [73] | Assignee | Dover Corporation<br>New York, N.Y. |

[54] DUAL-PURPOSE WELDING CABLE
9 Claims, 7 Drawing Figs.

[52] U.S. Cl. .................................................. 219/130,
174/15 C
[51] Int. Cl. .................................................. B23k 9/00
[50] Field of Search .......................................... 219/74, 75,
130, 136; 74/501; 138/139, 134; 174/15

[56] References Cited
UNITED STATES PATENTS

| 1,953,915 | 4/1934 | Burgett et al. ................. | 219/136 X |
| 2,302,158 | 11/1942 | Van Uulpen .................. | 74/501 X |
| 2,666,832 | 1/1954 | Landis et al. .................. | 219/130 |
| 3,089,022 | 5/1963 | Kinney .......................... | 219/130 |
| 3,194,943 | 7/1965 | Flora ............................. | 219/130 |
| 3,249,734 | 5/1966 | Meyer ............................ | 219/130 |
| 3,281,571 | 10/1966 | Gilmore ......................... | 219/130 |
| 3,283,121 | 11/1966 | Bernard et al. ................ | 219/130 |
| 2,691,900 | 10/1954 | Brickman ...................... | 138/131 X |
| 2,730,134 | 1/1965 | Morse ............................ | 138/134 X |

Primary Examiner—J. V. Truhe
Assistant Examiner—George A. Montanye
Attorney—Hume, Clement, Hume & Lee ABSTRACT: A dual-purpose welding cable having increased electrode size and welding current capacity without substantially increased cable diameter or weight. A flexible interior electrode conduit and readily removable flexible liner are provided, each in the form of a flexible tube formed of helically wound spring metal strip to have normally butted edges defining a seam which follows a helical path about the axis of the tube.

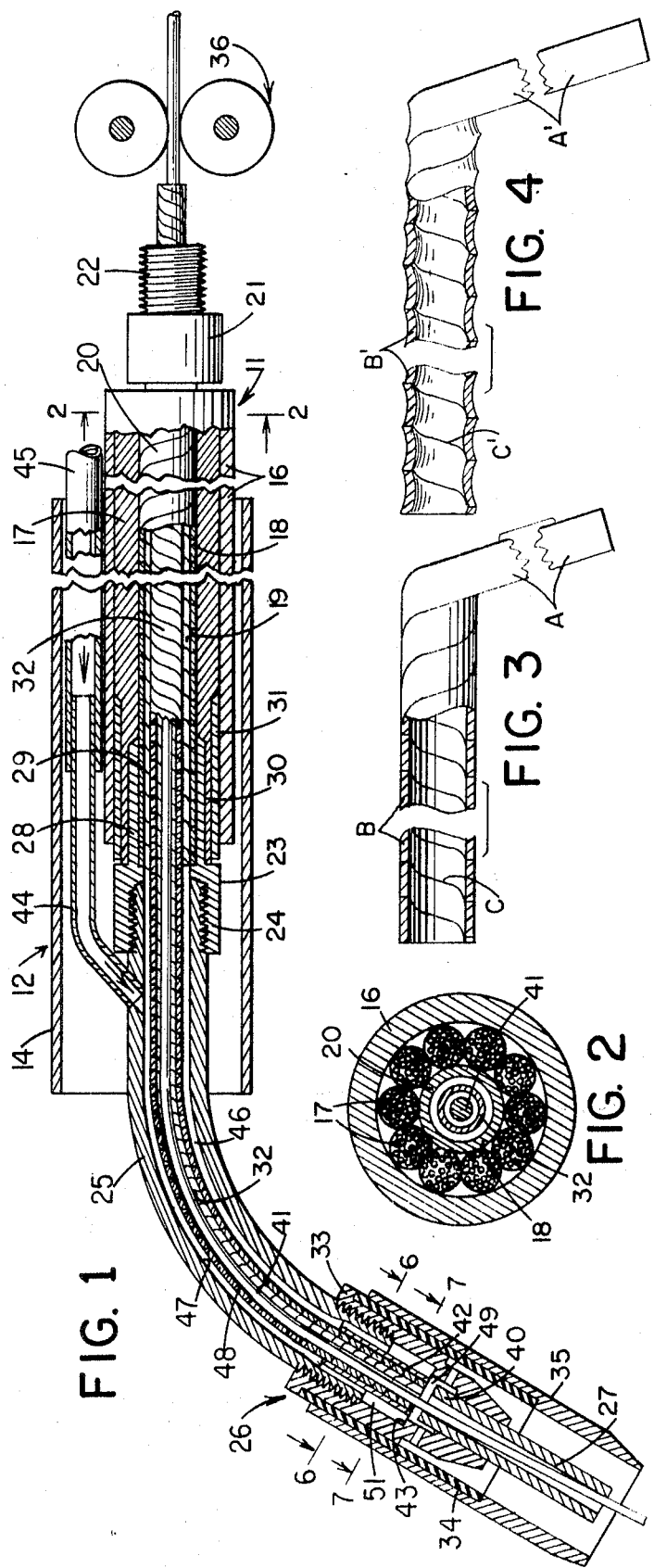
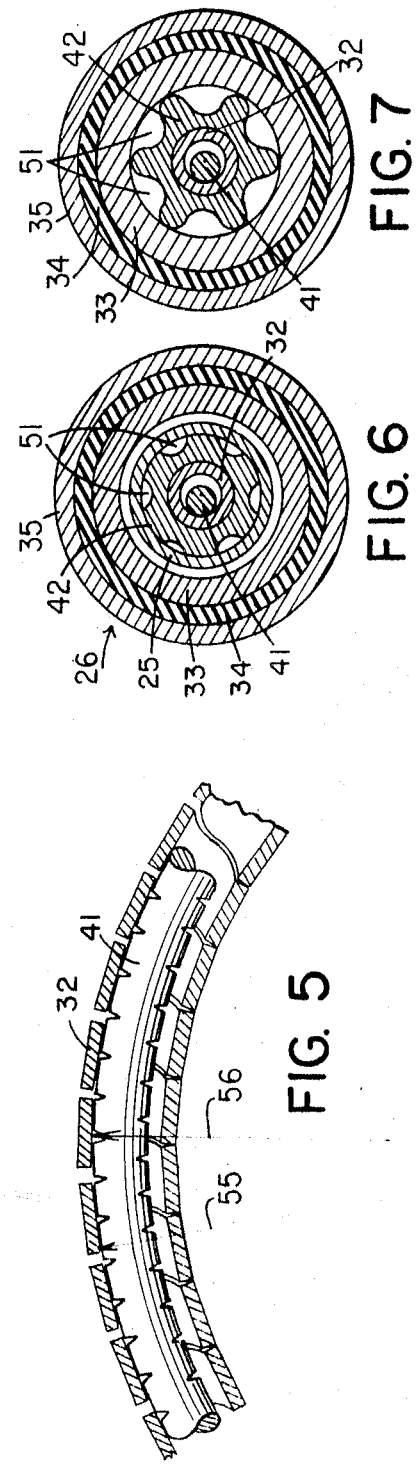
INVENTORS
ARTHUR A. BERNARD
RICHARD A. BERNARD
BY Hume, Clement, Hume & Lee
Attys.

DUAL-PURPOSE WELDING CABLE

This invention relates to dual-purpose welding cable, so named because it conducts both welding electrode and welding current to a manually directed arc welding gun from a remotely located electrode feeding machine. The remote electrode feeding machine withdraws consumable type electrode from coils or reels and pushes the electrode through the flexible dual-purpose welding cable to the manually directed arc welding gun and through the gun to the welding arc.

Heretofore, there have been various types and designs of dual-purpose welding cables, and all of them have certain disadvantages and restrictions which limit their usefulness.

The maximum size of electrode which can be efficiently fed through all makes and types of conventional dual-purpose welding cable is 3/32-inch diameter. Therefore, the deposition rate at which gas-shielded arc, submerged-arc, and open-arc consumable electrode arc welding processes can be deposited is limited to the maximum amount of welding current which this size of electrode can conduct between the welding current contact tip and the welding arc without becoming harmfully resistance heated, the critical current being about 525 amperes. The capacity of conventional designs cannot be increased by simply increasing the size of the internal conduit conducting the electrode and the size of the cable current conductors because to do so would result into a bulk and a weight which would overfatigue the workman handling the guns. Thus, heretofore, considering all previously developed and patented types of dual-purpose welding cable, the only type which has withstood the test of time for applying 3/32-inch diameter electrode consists of an internal electrode conduit made by helically winding 3/32-inch diameter round spring wire into a flexible tube about 0.152 inch I.D. and about 0.340 inch O.D., with 11–10,380 circular mill current conductors (totaling 114,180 circular mills in all) wrapped around the electrode conduit, and provided with an electric insulating jacket in the form of a tube made of neoprene with a wall about one-eighth of an inch thick which, in all, produces a dual-purpose welding cable with an overall diameter about seven-eighths of an inch weighing about 1¼ pounds per lineal foot. Beyond this bulk and weight, the fatigue problem exists.

The flexible conduit through which electrode is fed to arc welding guns can become solidly plugged with foreign material carried into the conduit by the electrode. The foreign material is primarily minute size flakes of oxide and metal chips loosened from the surface of the electrode by knurled feed rolls used to provide adequate traction to push the electrode through the conduit and through the welding gun to the welding arc. To date, the only possible solution to the plugging problem is the use of removable liners which can be removed from the flexible conduit and cleaned periodically before becoming totally plugged. However, here again, the limiting factors of size and weight of the dual-purpose welding cable are the determining factors of whether or not the conduit can be fitted with a removable liner. For example, the type of conventional dual-purpose welding cable mentioned above, which contains an electrode conduit made of 3/32-inch diameter round wire, cannot be enlarged to accommodate a liner without exceeding the bulk and the weight which becomes fatiguing. Moreover, this type of conventional welding cable has about 2,000 crevices between the turns of the 3/32-inch coiled wire in a 15-foot length, all serving to trap and hold the foreign material and thereby cause the buildup of plugging conditions. As of this date, conventional dual-purpose welding cable with removable conduit liner is available for handling electrode up to five sixty-fourths of an inch in diameter, but there is no prior art dual-purpose welding cable available with a removable conduit liner for handling electrode three thirty-seconds of an inch in diameter and larger. Moreover, in the prior dual-purpose welding cables which are equipped with removable conduit liners, the liners are difficult and time consuming to remove for cleaning. Generally, the conventional liner is clamped at one or both ends of the flexible conduit. Hence, to remove the liner, either the complete welding gun must be removed at the gun end of the welding cable, or the welding cable must be removed at the opposite end from the electrode feeder, or both ends must be disconnected.

Another reason why conventional-type liners have not been successfully used in dual-purpose welding cable for handling electrode larger than five sixty-fourths of an inch in diameter is that the conventional liner normally consists of either a small round wire helically wound into the shape of a tube or consists of a plastic tube. Neither type is stiff enough to withstand the force of the electrode-feeding operation with the result that the liner upsets and spirals within the electrode conduit, causing the electrode itself to develop what is called a "corkscrew" shape which cannot efficiently pass through the bore of the welding current contact tip in the welding gun.

Still another reason inch in a conduit or a conduit liner made of round wire have not been successfully used in a dual-purpose welding cable for handling electrode larger than three thirty-seconds of an inch in diameter is the excessive overload which would be imposed on the electrode feeding machine. In fact, it is practically impossible for an electrode feeding machine to push ⅛-inch size electrode through a conduit or a conduit liner made of round wire when the dual-purpose welding cable is connected to a gooseneck type arc welding gun. The reason for this is that, to provide enough traction to feed ⅛-inch size electrode, knurled feed rolls are used which transfer knurl formation to the surface of the electrode, and the knurls along the surface of the electrode mesh into the crevices between the turns of the round wire along the bend of the gooseneck greatly impeding passage of the electrode. When the liner is a plastic tube, it wears rapidly, and its wall thickness increases when it is compressed in length with the result that it hugs the electrode and thereby excessively increases the feeding load.

Another disadvantage which is inherent in all conventional types of dual-purpose welding cable is that, if the force required to push the electrode through the welding gun and welding current contact tip momentarily increases, the electrode leaves the bore of the contact tip in spurts, a condition which produces what is commonly called a "hunting" action at the arc. This undesirable "hunting" action is due to a rapid cycling of the flexible conduit stretching and contracting in length. If the difference between the stretched and contracted length is one-eighth of an inch, then the electrode will leave the tip of the contact tip in about ⅛-inch length spurts, a circumstance which produces a very harmful arc voltage condition. The only solution to this problem is to employ an electrode conduit which can withstand a tensile force (before starting to stretch) which exceeds the force required to push the electrode through the conduit (or through the conduit liner), through the welding gun, and through the welding current contact tip. Conduit which is made of small diameter round wire, unless prohibitively large, generally cannot withstand the inch pound torque applied to the electrode at the feed rolls without stretching.

The principal object of this invention, therefore, is to provide a dual-purpose welding cable for applying all types of semiautomatic arc welding processes which use consumable type electrode in continuous coiled lengths and which has the capability for conducting larger sizes of electrode than have been used heretofore and the capability for conducting the higher volumes of welding current required to efficiently convert the larger sizes of electrode into weld metal, all without substantial increase in either overall diameter or weight beyond that of conventional dual-purpose welding cables which are limited in capacity to a lower range of electrode sizes.

Another equally important object of this invention is to provide a dual-purpose welding cable which can handle larger sizes of electrode than could be handled heretofore and wherein the flexible electrode conduit is equipped with a removable liner, yet weighs no more and is no larger in overall diameter than conventional welding cables which are limited in capacity to a smaller range of electrode sizes and which do not contain removable liners.

Another equally important object of this invention is to provide a dual-purpose welding cable wherein the liner within the flexible electrode conduit can be removed, cleaned, and reinserted within a few minutes simply by removing the head portion of the welding gun at the arc end of the gun.

Still another important object of this invention is to provide a liner for the electrode conduit of a dual-purpose welding cable which can withstand the electrode feeding force applied to the electrode without being compressed into a shorter length than the length of the electrode conduit, so as to prevent the liner and, hence, the electrode from spiraling.

The objects of this invention are attained by providing a dual-purpose welding cable wherein the internal electrode conduit and its liner each have the form of a metal tube made flexible by having the seam between the butted edges of spring steel strip or flat spring wire follow a helical path around the axis of the tube. This provides a flexible electrode conduit and a removable liner, both of which have smooth exterior surfaces and smooth bores so that the smooth exterior surface of the liner slips easily into and out of the smooth bore electrode conduit, and most importantly, provides a smooth bore liner which is free of crevices which would trap foreign material and impede the passage of the electrode by meshing with the roughened knurled surface of the electrode.

Other objects, features, and advantages of this invention will be apparent from the following description taken in conjunction with the drawings in which:

FIG. 1 is a view partly in elevation and mostly in cross section of the dual-purpose welding cable of the present invention connected to an arc welding gun.

FIG. 2 is an enlarged cross-sectional view taken along lines 2-2 of FIG. 1.

FIG. 3 is a view partly in cross section, illustrating how the flexible conduit and the removable liner of this invention are made from spring steel strip or rectangular shape spring wire.

FIG. 4 is a view like that of FIG. 3 but wherein the spring steel strip or rectangular shape wire is slightly curved across its width.

FIG. 5 is an explanatory view illustrating why it is virtually impossible for the roughened surface of the electrode (caused by the use of knurled feed rolls) to make contact with the butted edges of the spiraled metal strip or flat wire of the liner of the present invention.

FIG. 6 is an enlarged cross-sectional view taken along lines 6-6 of FIG. 1.

FIG. 7 is an enlarged cross-sectional view taken along lines 7-7 of FIG. 1.

Referring now to FIG. 1, the dual-purpose welding cable 11 of this invention is shown connected to an arc welding gun 12. The dual-purpose conduit 11, shown also in FIG. 2, consists of an electrical insulating flexible jacket or sheath 16 in the form of a tube made of neoprene or other suitable pliable insulating material, a welding current conducting portion consisting of ten stranded copper wire conductors 17, each of 16,510 circular mill size (totaling 165,100 circular mills for the ten conductors), helically wrapped around a flexible electrode conduit 18 made to be flexible by helically wrapping spring steel strip or flat spring wire into a butted-edge spiraled seam tube which has a smooth inside surface 19 and a smooth outside surface 20. Affixed at one end of the welding current conductors 17 and the flexible conduit 18 is an end fitting 21 provided with an externally threaded end portion 22 for attachment to the electrode-feeding machine (not shown). At the opposite end of the dual-purpose welding cable, the current conductors 17 and the flexible conduit 18 are affixed to another end fitting 23 which is provided with an internally threaded end portion 24 for attachment to a tubular main trunk member 25 of the arc welding gun, commonly called the gooseneck. The gooseneck 25 is fabricated of efficient electrically conductive metal such as copper. As illustrated in FIG. 1, the gooseneck 25 extends forwardly from within a handle portion 14 of the arc-welding gun. The handle portion 14 is attached to the gooseneck by suitable fastening means (not shown). The exposed curved portion of the gooseneck 25 is preferably encased within a jacket (not shown) of electrical insulating material. The forward end of the gooseneck 25 is threaded for attachment to what is commonly called the head assembly 26 of an arc welding gun. The head assembly 26 includes an attached welding current contact tip 27, a head member 33, an insulating sheath 34, and a gas nozzle 35.

The method of affixing the welding current conductors 17 and the flexible conduit 18 to the end fitting 23 is by compression. One end of the fitting 23 is in the form of a bushing 28 within the bore of which the end 29 of the flexible conduit 18 is telescoped and around the periphery of which the ends 30 of the welding current conductors 17 are wrapped. The compression force is developed by compressing a band 31 of semisoft metal such as copper around the ends of the current conductors with sufficient force to tightly compress the ends of the conductors against the periphery of the bushing 28 and to compress the circumference of the bushing 28 so that the inner surface of the bushing 28, in turn, is tightly compressed against the outer surface of the inserted end of the flexible conduit 18. The opposite ends of the welding current conductors 17 and the flexible electrode conduit 18 are affixed to the end fitting 21 at the electrode feeding machine by identical means and procedure which, for the sake of simplicity in the drawings, are not repeated in the drawings.

Contained within the flexible conduit 18 is a removable flexible conduit liner 32 which is also made of spring steel strip or spring flat wire and which is of the same construction as the flexible conduit 18, with the exception that the strip is preferably although not necessarily narrower and of a lighter gauge. For reasons to be outlined further on, it is important that the width of the strips be not less than a certain minimum in relation to the inside diameter of the tubes and that the thickness of the strips not exceed a certain thickness in relation to the width of the strips.

Here it is important to note that in FIG. 1, the removable liner 32 extends from within the head assembly 26, a short distance from the top end 40 of the welding current contact tip 27, through the gooseneck 25, through the total length of the flexible conduit 18, and through the end fitting 22 to the electrode feeding rolls 36 (shown diagrammatically), yet no means whatever is shown for clamping or fastening the removable liner 32 anywhere along its total length. For reasons to be given further on with reference to FIGS. 3 and 4, the liner 32 cannot be upset or shortened in length by the electrode-feeding force. Therefore, to retain the liner 32 within the total length of the electrode conducting channelway, it is only necessary to prevent the liner 32 from being pushed out of the conduit 18 by any drag which exists between the inner surface 34 of the liner 32 and the surface of the electrode 41 as the electrode is fed through the conduit 18 and the gooseneck 25 of the welding gun. This has been accomplished by compressing a bushing 42 onto the end of the removable liner 32 and by providing a forward thrust abutment in the form of a circular ledge 43 within the bore of the head member 33 for the bushing 42 to butt against. To remove the liner 32, therefore, it is only necessary to detach the head assembly 26 from the arc end of the gun 12.

It should be noted in connection with FIG. 1 that, when this invention is used for applying arc-welding processes which use a gas for shielding the welding operation, a small tube 44 is attached to the gooseneck 25 to conduct the shielding gas from a flexible hose 45 connected to a source (not shown), down through the channelway 46 formed by the inside wall 47 of the gooseneck portion and the outer surface 48 of the removable liner 32. Referring additionally to FIGS. 6 and 7, the bushing 42 previously referred to at the end of the removable liner 32 is permanently attached thereto by compressing the bore of the bushing onto the outer surface of the liner without substantially reducing the inside diameter of the liner 32. This bushing renders three additional functions, namely:

(1) it is provided with peripheral channelways 51 for the passage of shielding gas from the channelway 46 within the gooseneck portion 25 into the cavity 49 of the head member 33; (2) it centers the bore of the liner 32 directly over the bore through the contact tip 27; and (3) it performs as a knob for withdrawing the removable liner 32.

The enlarged cross-sectional view of FIG. 2 is quite accurate in showing the cross-sectional size of the different components in relation to each other. Actually, the dual-purpose welding cable illustrated in FIGS. 1 and 2 can provide a capacity to handle any range of electrode sizes but will be referred to by way of example in the following discussion as having a capacity to handle the range of electrode sizes from five sixty-fourths inch to one-eighth inch diameter, inclusive. By way of example, the electrode 41 shown within the removable liner 32 is of one-eighth inch diameter, and the inside diameter of the removable liner 32 is about 0.170 inch. Therefore, the difference in these diameters, namely 0.045 inch, provides ample space for passage of the ⅛-inch diameter electrode. The outside diameter of the liner 32 is about 0.220 inch, and the inside diameter of the flexible conduit 18 is about 0.246 inch. Therefore, the difference in these diameters, namely 0.026 inch, provides adequate space for slidably inserting and removing the liner into and out of the conduit 18. The outer diameter of the flexible conduit 18 is about 0.330 inch. As mentioned previously, there are 10–16,510 circular mill current conductors 17 (totaling 165,100 circular mills) which, when slightly compressed between the jacket 16 and the conduit 18, have an overall diameter of about 0.635 inch. The wall of the jacket 16 is about seven sixty-fourths inch thick which results in an overall welding cable diameter of 0.853 inch. Thus, the overall diameter of this dual-purpose welding cable, which has a capacity for handling ⅛-inch diameter electrode and which has a removable liner 32, is not as large in overall diameter as the conventional dual-purpose welding cable which is limited to 3/32-inch diameter electrode and has no removable liner. Moreover, the weight per lineal foot of this dual-purpose welding cable with a capacity for ⅛-inch size electrode is 15¼ ounces per foot as compared with 20 ounces per foot for the conventional 3/32-inch electrode capacity dual-purpose welding cable.

The objects of this invention previously listed have been made possible by the combination wherein both the flexible electrode conduit 18 and its removable liner 32 are made of spring steel strip or rectangular shape spring wire. The conduit 18, for handling a maximum size of ⅛-inch diameter electrode with a tensile value sufficient to withstand the feeding of the ⅛-inch size electrode without stretch, is made of 0.042 inch gauge and 0.187-inch wide spring steel strip and is back-pressure-wound to withstand a 54-pound pull before starting to stretch. It is important to note that the cross-sectional area of the spring steel strip is about 0.00377 square inch which is about equal to the cross-sectional area of a conventional 3/32-inch diameter round spring wire conduit. However, since the width of the strip is twice the diameter of the round wire, only one half the number of turns are required per lineal foot of the conduit 18, which reduces the weight by one half and allows for the weight of the liner and the additional weight due to the increased size of the current conductors.

The removable liner 32 is made from spring steel strip 0.025 inch gauge by 0.125 inch wide and, unlike the conduit 18, is not wound with substantial back pressure because, in service, the liner 32 is not under tension as the conduit 18 but rather is under compression. At the helical seam of the liner, however, the edges of the strip are butted tightly together so that there is no space to allow for a reduction in length when subjected to compression. Being made of strip which has a much greater spring value than has round wire equal in diameter to the thickness of the strip, the liner 32 has no tendency for the helical turns to overlap when subjected to compression or to take the shape of short length spirals within the conduit. It is also important to note that, although the bore within the liner 32 is more than ample for a ⅛-inch size electrode 41, the outside diameter of the liner 32 plus the 0.026-inch space between the liner 32 and the bore of the conduit 18, plus the thickness of the conduit 18, totals an overall diameter which, as previously noted, is slightly less than the outside diameter of the conventional 3/32-inch electrode capacity dual-purpose welding cable which has no liner. This saving of space allows for the larger capacity welding current conductors.

To make a dual-purpose welding cable according to this invention for handling a smaller or a larger range of electrode sizes and provide all of the objects previously listed, it is essential that the width of strip in both the conduit 18 and the removable liner 32 be not less than 70 percent of the inside diameter of the tube into which it is formed and that the gauge thickness of the strip be not more than 40 percent of the width of the strip. As illustrated in FIG. 1, the lay of liner 32 is preferably of opposite hand than that of the conduit 18.

FIG. 3 shows how the spring steel strip A is formed into a straight tube B made flexible by having the seam C of the tube follow a helical path around the axis of the tube and provide both an inside and an outside smooth surface by butting the edges of the strip. The amount of back pressure is controlled by varying the angle at which the strip is fed into the forming operation in relation to the axis of the formed tube.

FIG. 4 illustrates an improvement as compared with FIG. 3, the improvement being that the strip A' is slightly curved across its width as the strip is fed into the tube-forming operation which, in the case of the liner 32, allows for wear before the electrode can contact the grooveless seam C' of the tube B' when the tube is substantially straight.

FIG. 5 illustrates why it is impossible for the roughened surface of the electrode 41, caused by using knurled feed rolls, to contact the seam of the liner 32 when the liner 32 is flexed into a curve. When the liner 32 is curved, the width of the helical strip remains substantially straight. Therefore, the radius of the curvature at the edges of the strip, as indicated by reference numeral 55, exceeds the radius at the median of the strip, as indicated by reference numeral 56.

To shorten and to simplify the following claims, the material used for making both the conduit 18 and the liner 32 is referred to as being "spring metal strip." The material normally would be spring steel strip. The metal strip can also be round wire flattened to make it rectangular in cross section. The strip may also be fabricated spring type stainless steel or spring type bronze. It should also be understood that the welding current conductors 17 can be stranded fine wire aluminum or fine gauge steel wire plated with a metal such as silver which has unusually high electrical conducting properties.

While certain embodiments of the present invention have been illustrated and described in the specification and specific terminology used in their description, it is to be understood that these are merely by way of example and are in no manner to be considered limitations. It will be apparent that certain modifications may be made within the scope of the claims without departing from the spirit of the invention.

What we claim is:

1. Arc-welding apparatus including a welding current power source, a source of consumable electrode, an electrode feeding machine, and an arc-welding gun wherein the improvement comprises:

a flexible conduit and a removable flexible liner therein conducting continuous lengths of said consumable electrode from said electrode feeding machine to said arc welding gun, said flexible conduit and said flexible removable liner each in the form of a flexible tube formed of spring metal strip of rectangular cross sectional configuration helically wound to have butted edges defining a seam which follows a helical path about the axis of said tube, said flexible liner having an outside diameter smaller than the internal diameter of said flexible conduit such that said flexible liner is readily insertable and removable into and out of said flexible conduit;

a plurality of flexible welding current conductors helically wrapped around said flexible conduit conducting welding current from said welding current power source to said arc welding gun;

a flexible tube of electrical insulating material encasing said plurality of welding current conductors;

a fitting of electrically conductive material affixed to one end of said flexible conduit and to one end of said plurality of welding current conductors connecting said flexible conduit and said plurality of welding current conductors to said electrode feeding machine and said welding current power source; and a second fitting of electrically conductive material affixed to the opposite end of said flexible conduit and to the opposite end of said plurality of said welding current conductors connecting said flexible conduit and said plurality of welding current conductors to said arc-welding gun.

2. The invention defined in claim 1 wherein said flexible conduit is helically wound under back pressure to provide a tube which is inextensible under any tension force less than a predetermined magnitude in order to resist change in length due to tension force developed by the passage of an electrode through said conduit.

3. The invention defined in claim 1 wherein said rectangular cross sectional configuration of said spring metal strip is slightly dished inwardly of said flexible tube formed by said helical winding.

4. The invention as set forth in claim 1 wherein in both said flexible conduit and said flexible liner the width of said metal strip is not less than 70 percent of the inside diameter of the tube into which it is formed and the thickness of said metal strip is not greater than 40 percent of the width of said metal strip.

5. Arc-welding apparatus including a welding current power source, a source of consumable electrode, an electrode feeding machine, and an arc-welding gun for gas-shielded arc welding having a handle portion with an electrically conductive tubular portion extending from said handle portion and carrying a removable head assembly at its forward end, the head assembly including an electrically conductive head member with an attached welding current contact tip wherein the improvement comprises:

a flexible conduit;

a first fitting at one end of said flexible conduit for attachment to said electrode-feeding machine;

a second fitting at the opposite end of said flexible conduit for attachment to said tubular portion, said flexible conduit and said tubular portion cooperating by serial alignment of their respective bores to form a continuous electrode passageway extending from said electrode feeding machine through said flexible conduit and through said tubular portion to said head member; and a removable flexible liner having a bushing affixed to one end thereof, said bushing having peripheral channels and being slidably received within said head member for centering said flexible liner relative to said head member bore, said flexible liner being slidably retained within said flexible conduit solely by a forward thrust abutment of said bushing against said head member, said flexible liner being freely removable from said passageway be detaching said head member containing said abutment, grasping said bushing, and withdrawing said flexible liner from the forward end of said tubular portion of the welding gun.

6. The invention as set forth in claim 5 wherein said flexible conduit and said removable liner are each in the form of a flexible tube formed of spring metal strip helically wound to have butted edges defining a seam which follows a helical path about the axis of said flexible tube.

7. The invention defined in claim 5 wherein said flexible liner is in the form of a flexible tube formed by a spring metal strip of rectangular cross sectional configuration helically wound to have butted edges defining a seam which follows the helical path about the axis of said tube.

8. The invention defined in claim 7 wherein said rectangular cross sectional configuration is slightly dished inwardly of said flexible tube.

9. Arc-welding apparatus including a welding current power source, a source of consumable electrode, an electrode feeding machine, and an arc-welding gun wherein the improvement comprises:

a flexible tube formed of spring metal strip of rectangular cross sectional configuration helically wound to have butted edges defining a seam which follows a helical path about the axis of said tube, said spring metal strip being helically wound under back pressure to provide a tube which is inextensible under any tension force less than a predetermined magnitude in order to resist change in length due to tension force developed by the passage of an electrode through said flexible conduit;

a plurality of flexible welding current conductors helically wrapped around said flexible tube conducting welding current from said power source to said arc-welding gun;

an outer jacket of insulating material encasing said plurality of welding current conductors;

a fitting of electrically conductive material affixed to one end of said flexible tube and to one end of said plurality of welding current conductors connecting said flexible tube and said plurality of welding current conductors to said electrode feeding machine and said welding current power source; and a second fitting of electrically conductive material affixed to the opposite end of said flexible tube and to the opposite end of said plurality of welding current conductors connecting said flexible tube and said plurality of welding current conductors to said arc-welding gun.

UNITED STATES PATENT OFFICE
CERTIFICATE OF CORRECTION

Patent No. 3,596,786          Dated August 3, 1971

Inventor(s) ARTHUR A. BERNARD and RICHARD A. BERNARD

It is certified that error appears in the above-identified patent and that said Letters Patent are hereby corrected as shown below:

IN THE SPECIFICATION:

Column 2, line 17,      after "reason" delete "inch in"

and add --why--

IN THE CLAIMS:

Column 8, line 5,      "be" should read --by--

Signed and sealed this 16th day of May 1972.

(SEAL)
Attest:

EDWARD M. FLETCHER, JR.          ROBERT GOTTSCHALK
Attesting Officer               Commissioner of Patents